July 16, 1957
N. SCHWARTZ
2,799,816
ADJUSTABLE CAPACITOR
Filed Oct. 7, 1953
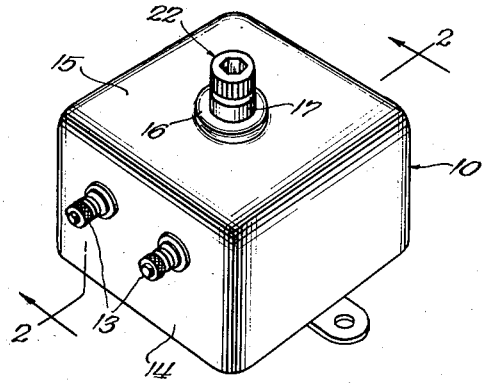
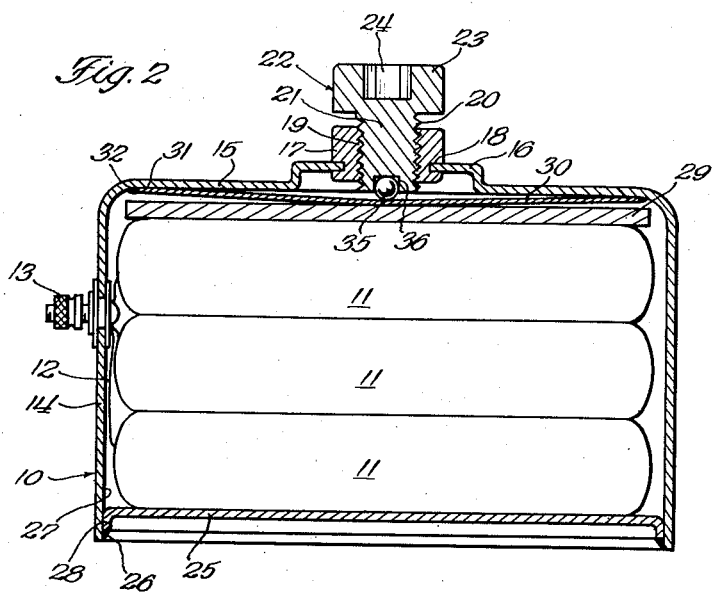
INVENTOR.
Norman Schwartz
BY
Bernard Kriegel
ATTORNEY United States Patent Office 2,799,816
Patented July 16, 1957

2,799,816

ADJUSTABLE CAPACITOR

Norman Schwartz, Los Angeles, Calif., assignor to Southern Electronics Co., Burbank, Calif., a limited partnership Application October 7, 1953, Serial No. 384,715

5 Claims. (Cl. 317—245)

The present invention relates to electrical condensers, and more particularly to condensers capable of adjustment to vary their capacitance after their assembly has been completed.

Certain types of condensers are enclosed permanently in a casing and, in fact, may be sealed hermetically therein. However, after such enclosing has occurred, there has heretofore been no provision for changing the capacitance of the condenser in the event that subsequent tests show the condenser capacitance to be in error.

Accordingly, it is an object of the present invention to provide a permanently enclosed electrical condenser whose capacitance can be changed whenever desired after the condenser has been finally assembled, without disturbing the condenser enclosure.

Another object of the invention is to provide a hermetically sealed electrical condenser whose capacitance can be changed at any time without disturbing its hermetical sealing.

A further object of the invention is to provide a permanently enclosed or hermetically sealed electrical condenser, in which the capacitance of the condenser can be changed in a simple and facile manner, without damage to any of the condenser parts.

Yet another object of the invention is to provide a permanently enclosed or hermetically sealed electrical condenser whose capacitance can be changed from alocation externally of the condenser, and without disturbing the permanent or hermetically sealed status of the enclosure.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is an isometric projection of one form of electrical condenser embodying the invention;

Fig. 2 is a section, on an enlarged scale, taken along the line 2—2 on Fig. 1.

In its general aspects, the invention contemplates the provision of one or a bank of condenser windings suitably electrically connected to each other and placed in an enclosure or housing, which may be hermetically sealed. The electrically conductive portions of the condenser windings are attached to suitable terminals, which are used in their normal manner for appropriately connecting the condenser in an electric circuit. These terminals also afford the means for testing the capacitance of the condenser after it has been completely assembled. If the capacitance is found to be in error, either too high or too low, such capacitance can be adjusted or varied to the correct amount by varying a compressive force or pressure applied to the condenser windings within their enclosed casing or housing. Preferably, the enclosing housing is hermetically sealed, the pressure being applied without disturbing the hermetic seal.

In the specific form of invention disclosed in the drawings, a suitable housing or casing 10 encloses one or several banks or stacks of condenser windings 11, each condenser unit consisting, as is well known, of alternate layers of conducting and dielectric elements, such as aluminum foil and polystyrene suitably coiled about one another and then flattened to assume the general shape shown in Fig. 2. The conductive condenser elements of the banks of condenser units 11 are secured to leads 12 connected to a pair of connectors, terminals or binding posts 13 extending through one of the housing side walls 14 in sealed relation with respect thereto, in a known manner. The housing 10 may assume any desired shape, the one specifically disclosed having side walls 14 merging into an end wall 15 integral therewith. This end wall has a central raised portion 16 in which a nut or boss 17 is secured, as by inserting the inner marginal portion of the raised end wall within a circumferential groove 18 in the exterior of the boss. The boss has an internal thread 19, to accommodate a companion external thread 20 of the stem or spindle 21 of an adjusting screw 22 extending therethrough, the screw having a suitable head 23 provided with a non-circular socket 24 for the reception of a suitable wrench (not shown), by means of which the screw may be rotated within the stationary nut or boss 17, and advanced axially in a direction either into or out of the housing 10.

The turning of the adjusting screw 22 will determine the amount of axial force or pressure to be imposed upon the one or several banks or stacks of condenser units 11 disposed within the housing. These condenser units may bear upon a cover or closure 25 for the open end of the housing, which is permanently secured within the housing in leakproof relation with respect to its side walls 14, as by use of solder 26 running completely around the inner wall 27 of the housing and the depending flange 28 of the cover 25.

A pressure plate 29 bears upon the opposite end of the bank of condensers 11, this pressure plate preferably being rigid and made of steel, or other suitable material. A diaphragm 30, which may be made of a suitable metal, is arranged between the pressure plate 29 and the end wall 15 of the housing, the marginal portions 31 of the diaphragm being permanently and hermetically sealed to the inner surface of the end wall 15 of the housing, as by use of solder 32 extending completely around the perimeter of the diaphragm 30.

It is evident that the soldered connection of the cover 25 to the open end portion of the housing 10 and the soldered connection of the margin 31 of the diaphragm 30 to the end wall 15 of the housing, as well as the leakproof seal provided between the housing wall 14 and the terminals 13, hermetically seals the condenser units 11 within the housing 10. Air cannot leak into and out of the housing between the cover 25 and the housing, and any air that may leak along the screw and boss threads 19, 20 is prevented from entering the housing portion containing the units 11 by the sealing of the diaphragm 30 with respect to the end wall 15 of the housing.

In addition to its sealing function, the diaphragm 30 serves to transmit thrusts between the adjusting screw 22 and the pressure plate 29 while retaining its leakproof seal with the housing. Thus, the adjusting screw 22 may be turned to provide a pressure upon the diaphragm 30, the diaphragm contacting the pressure plate 29 and transmitting such pressure thereto. The movement of the pressure plate 29 toward the end cover or closure 25 increases the compressive force on the bank of condenser units 11. Such increase in the pressure force on the units will increase their capacitance.

When completely assembled, the condenser units 11 are under pressure supplied by the adjusting screw 22. If a test shows that the condenser units do not have the proper capacitance, a suitable wrench may be inserted in the screw socket 24 and the screw 22 then turned in the proper direction within the boss 17, to shift the screw axially in the housing, causing a change in the force transmitted through the diaphragm 30 and pressure plate 29 to the bank of condenser units 11, until the capacitance of the condenser has been adjusted to the desired correct value. By increasing the pressure through appropriate turning of the screw 22 in one direction, the capacitance of the condenser is increased. In the event the capacitance of the condenser is found to be too high, then the turning of the adjusting screw 22 in the opposite direction will effect a relieving of the pressure on the bank of condenser units 11, and will reduce the capacitance of the condenser.

The adjusting screw 22 could be made to bear directly on the diaphragm 30. However, when the end of the adjusting screw bears upon the diaphragm, it might damage the latter upon being rotated within the nut or boss 17, in view of its sliding friction against the diaphragm. Such potential damage of the diaphragm is avoided in the present instance by interposing an antifriction element between the adjusting screw 22 and the diaphragm 30. As disclosed, a ball 35, made of steel or other appropriate metal, is disposed within a socket 36 located centrally of the axis of the screw 22, this ball bearing against the outer surface of the diaphragm 30. Thus, the turning of the adjusting screw 22 to shift it axially of the housing 10 will not produce any rubbing or friction action of the screw end upon the diaphragm 30. Instead, the axial force is transmitted from the adjusting screw 22, through the ball 35, to the diaphragm. The ball 35 may remain stationary with respect to the diaphragm 30, the screw 22 rotating upon the ball, or the ball may have relative rotation to some extent with respect to both the adjusting screw and the diaphragm. In any event, the ball will minimize, if not eliminate entirely, any sliding friction forces upon the diaphragm 30, which might tend to damage it to the extent that the hermetic sealing of the housing is broken.

It is, accordingly, apparent that a condenser has been provided which is permanently enclosed in a housing, and which may also be hermetically sealed within the housing. Following such permanent enclosure or hermetic sealing, the capacitance of the condenser may be changed to a correct desired value at any time, and without disturbing the enclosure or its hermetic sealing. Such capacitance may be changed without damaging any of the condenser parts.

The inventor claims:

1. In a condenser: a hermetically sealed housing having side walls and an end wall secured to said side walls; one or more continuously wound condenser units in said housing, each unit including alternating layers of conducting and pliant, elastic dielectric elements contacting each other over substantially the entire area of their confronting faces; a cover secured and hermetically sealed to said side walls to close said housing and bearing against said one or more condenser units on one side thereof; a pressure plate in said housing bearing upon said one or more condenser units on the other side thereof over substantially the entire area of such side; a diaphragm secured and hermetically sealed to said housing and adapted to bear on said pressure plate; a member threaded in said end wall and accessible from the exterior of said end wall; and a rollable element engaging said member and diaphragm to transmit the axial motion of said member to said diaphragm and pressure plate to vary the pressure applied to said one or more condenser units over substantially the entire area of said confronting faces in response to rotation of said member.

2. In a condenser: a hermetically sealed housing having side walls and an end wall secured to said side walls; one or more continuously wound condenser units in said housing, each unit including alternating layers of conducting elements and pliant, elastic dielectric elements contacting each other over substantially the entire area of their confronting faces; a cover secured and hermetically sealed to said side walls to close said housing and bearing against said one or more condenser units on one side thereof; a pressure plate in said housing bearing upon said one or more condenser units on the other side thereof over substantially the entire area of such side; a diaphragm secured and hermetically sealed to said housing and adapted to bear on said pressure plate; means bearing upon said diaphragm to apply pressure to said plate, including a member threaded in said end wall and axially movable when rotated to vary the pressure applied to said plate and said one or more condenser units over substantially the entire area of said confronting faces.

3. In a condenser: a hermetically sealed housing having side walls and an end wall secured to said side walls; one or more continuously wound condenser units in said housing, each unit including alternating layers of conducting elements and polystyrene dielectric elements contacting each other over substantially the entire area of their confronting faces; a cover secured and hermetically sealed in said side walls to close said housing and bearing against said one or more condenser units on one side thereof; a pressure plate in said housing bearing upon said one or more condenser units on the other side thereof over substantially the entire area of such side; a diaphragm secured and hermetically sealed to said housing and adapted to bear on said pressure plate; means bearing upon said diaphragm to apply pressure to said plate, including a member threaded in said end wall and axially movable when rotated to vary the pressure applied to said plate and said one or more condenser units over substantially the entire area of said confronting faces.

4. In a condenser as defined in claim 3; wherein said housing is metallic.

5. In a condenser: a sealed housing having side walls and an end wall secured to said side walls; one or more continuously wound condenser units in said housing, each unit including alternating layers of conducting elements and pliant, elastic dielectric elements contacting each other over substantially the entire area of their confronting faces; a cover secured and sealed to said side walls to close said housing and bearing against said one or more condenser units on one side thereof; a pressure plate in said housing bearing upon said one or more condenser units on the other side thereof over substantially the entire area of such side; a diaphragm contacting said housing around the entire periphery of said diaphragm and secured and sealed to said housing and adapted to bear on said pressure plate; means bearing upon said diaphragm to apply pressure to said plate, including a member threaded in said end wall and axially movable when rotated to vary the pressure applied to said plate and said one or more condenser units over substantially the entire area of said confronting faces.

References Cited in the file of this patent

UNITED STATES PATENTS

| | | |
|---|---|---|
| 1,763,771 | Geloso | June 17, 1930 |
| 1,801,203 | Leece | Apr. 14, 1931 |
| 2,509,310 | Moreland | May 30, 1950 |
| 2,564,784 | Jones | Aug. 21, 1951 |
| 2,575,726 | Peck | Nov. 20, 1951 |
| 2,624,854 | Miller | Jan. 6, 1953 |

FOREIGN PATENTS

| | | |
|---|---|---|
| 348,536 | Great Britain | May 11, 1931 |
| 589,289 | Great Britain | June 17, 1947 |
| 589,728 | Great Britain | June 27, 1947 |